(12) United States Patent
Badrak et al.

(10) Patent No.: US 7,773,095 B1
(45) Date of Patent: Aug. 10, 2010

(54) METHOD AND SYSTEM FOR PROVISIONING FACILITY-BASED MAPS AND RELATED INFORMATION TO FIELD PERSONNEL

(75) Inventors: Maksym Badrak, Alpharetta, GA (US); Hossein Eslambolchi, Los Altos Hills, CA (US); Bala Surya Siva Sri Gaddamanugu, Alpharetta, GA (US); Charles C. Giddens, Conyers, GA (US); Jacquenetta M. Mason, Duluth, GA (US); Udaya Bhaskar Natha, Alpharetta, GA (US); Harold Jeffrey Stewart, Alpharetta, GA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1487 days.

(21) Appl. No.: 10/409,399

(22) Filed: Apr. 8, 2003

(51) Int. Cl.
*G09G 5/00* (2006.01)
*G01V 3/38* (2006.01)
*G06F 17/30* (2006.01)

(52) U.S. Cl. .................. 345/619; 702/5; 707/104.1
(58) Field of Classification Search ............. 345/619; 701/201–211; 702/5; 707/104.1, 100
See application file for complete search history.

(56) References Cited

U.S. PATENT DOCUMENTS

| 5,638,498 | A  | * | 6/1997 | Tyler et al. ............ 358/1.18 |
| 5,948,040 | A  | * | 9/1999 | DeLorme et al. ......... 701/201 |
| 6,421,725 | B1 | * | 7/2002 | Vermilyea et al. ........ 709/224 |
| 6,697,734 | B1 | * | 2/2004 | Suomela ................ 701/212 |
| 6,751,553 | B2 | * | 6/2004 | Young et al. ............. 702/5 |

\* cited by examiner

*Primary Examiner*—Joni Hsu

(57) ABSTRACT

The invention relates to a method and system for wireless and network based mapping method and system for supporting field personnel to access, select and download facilities related maps and related information. Mapping files are manipulated in accordance with a grid block overlay over a first level map display. Each of the grid blocks is uniquely identifiable and indexed with one or more algorithms necessary for the local creation of an enhanced and/or enlarged second level of display.

17 Claims, 5 Drawing Sheets

FIG. 2

NOTIFICATION IF DIG

Date: January 21, 2003       ABC One Call Center
Notification No: 123555-02    Positive Response Due : 01-23-03
                                         Tel: 908 555-1234
Caller: Deep Excavation Co.
Address: 156 Merrill Road
             Bedminster, NJ 08854

Site: Bedminster, Block 255, Lot 15    Map Plat Geocode: NJBED4866
Boundaries Points: Lat/Lon
     1. (40.7695,-75.00343)
     2. (40.7689,-75.00431)
     3. (40.7693,-75.00343)
     4. (40.7682,-75.00211)

Purpose: Construction of Addition to existing residence.

FIG. 3

AT&T Corp.
Ticket Task Management System    Ticket No.: 23333
Notification of Dig Information_____
Date: January 21, 2003        ABC One Call Center
Notification No: 123555-02    Positive Response Due : 01-23-03
Caller: Deep Excavation Co.    Tel: 908 555-1234
Address: 156 Merrill Road
          Bedminster, NJ 08854
Site: Bedminster, Block 255, Lot 15    Map Plat Geocode: NJBED4866
Boundaries Points: Lat/Lon
     1. (40.7695,-75.00343)
     2. (40.7689,-75.00431)
     3. (40.7693,-75.00343)
     4. (40.7682,-75.00211)
Purpose: construction of Addition to existing residence.

AT&T District: 2345-NJ    Field Op Id= HJSteward    Mobile Id=9085552222
Modify Authorize:Yes      Response:48 hours      Map Plat: Algorithm:23,101,44
Cables: (2)=2000-468, 1992-162      Risk: Cirtical
Map Level 1     OCC email:    23333NReply@OCC.com
Map Level 2     Excavator:    ticket2333@deepexcator.com

METHOD AND SYSTEM FOR PROVISIONING FACILITY-BASED MAPS AND RELATED INFORMATION TO FIELD PERSONNEL

FIELD OF THE INVENTION

The disclosed invention broadly relates to a network-based mapping method and system for supporting field personnel to access, select, and download facilities-related maps and related information.

BACKGROUND OF THE INVENTION

State-ordered mandates that facility service providers mark all underground facilities prior to anyone digging or excavating an area represent a costly, time-and-labor-intensive expense. Failure to comply with these mandates within the time allotted for response to any dig or excavation notification may result in significant financial exposure for repairs, lawsuits, and loss of goodwill. Accordingly, it behooves the prudent facility service provider to cooperate with the law and with the myriad of One Call Centers responsible for the in-take of intent to dig notifications, despite the apparent high costs of maintaining field personnel to process thousands, if not millions, of tickets throughout the year.

Most of the utility lines and underground pipes and conduits throughout the United States are buried and it is the responsibility of the utility provider to clearly mark and maintain the whereabouts of all these facilities. However, marking and maintaining a surface marking for each buried facility is neither realistic nor economically feasible. On the other hand, safety for the public is an overriding concern for both state and federal governments—so much so that facility awareness and notification laws have been passed to minimize risk and to protect the general public. These laws mandate utility or service providers having underground facilities to operate and cooperate with excavators and other facility service providers and to maintain these utilities and services in a safe and prudent manner.

To comply with these laws, utility or service providers are required to register and work with a One Call services organization responsible for in-taking all "intend to dig" notices from contractors, excavators and anyone else wishing to dig in areas having buried facilities. Prior to digging, a contractor or homeowner (excavator) calls an "8xx" telephone number and contacts an assigned One Call Center ("OCC") to report to the OCC its intent to dig within the boundaries of a specific geographic location. The operators at these OCCs take down all relevant information such as the calling party, telephone numbers, location of the property, as well as the exact location of the area within the property that the excavator plans to excavate. The operator then determines on the OCC's maps the exact location of where the planned excavation is to occur. In consultation with other OCC databases, the operator is able to identify the utility service providers that operate buried utilities within the targeted area. A notification is then sent to the corresponding utility service providers via fax, computer or other means of the OCC's receipt of a "notification to dig" ("ND").

These NDs are received by each of the identified utility service providers and contain data necessary for the utility service providers to take action. In particular, the NDs contain data that identifies the dig site in the form of geocodes, and lot/block numbers, the corresponding street address, excavator identification (commercial and homeowner), depth and purpose of excavation as well as other ancillary data necessary for the utility service provider to assess the existence or non-existence of its facilities within the target area and to assess the potential risks involved in allowing the excavation to proceed. The manner in which each utility service provider handles the processing of the received NDs is variable and in many instances is dependent upon the specific laws in place within the targeted area. For example, some utility service providers may use hard copies of "tickets" ("Tickets") that for the most part contain the information provided in the NDs, along with other data specific to the utility service provider's methods of processing the NDs. More specifically, some utility service providers provide an associated map with each Ticket generated to first assess whether it will be necessary for field personnel to go to the targeted area and mark the site or to decide that the proposed excavation site is of sufficient distance from their underground facilities that it does not pose a threat. Still other organizations, make it their policy to send field personnel to each targeted area that has buried facilities within the vicinity, just to ensure that an excavator is placed on notice of where each of its buried facilities are located.

In either case, the use of field personnel for utility service providers is a very time-and-labor-intensive activity and generally requires a multitude of field personnel to handle the hundreds, if not thousands, of Tickets generated each year. At AT&T for example, millions of tickets are generated each year to comply with state-mandated verification of its buried facilities, resulting in the expense of millions of dollars and thousands of man-hours. For this very reason, it is no surprise that utility service providers are seeking more efficient and less costly methods of processing Tickets as well as systems that would automatically provide documentation to demonstrate their due diligence in responding to dig notifications and preventing potential outages or disasters.

Accordingly, there is a need for a more efficient system and method of processing Tickets which minimizes processing time, reduces field man-hours and which documents field response activities associated with each Ticket generated.

SUMMARY

The present invention provides a method and system for provisioning a network-based mapping method and system for supporting field personnel to access, select and download facilities-related maps and related information. The advantages of the present invention are provided by a method and system whereby the downloading of a work order or Ticket is accompanied by a first level map file of a target dig site as well as instructions and related algorithms necessary for the creation of an enhanced and/or enlarged display of a selected area of the originally downloaded map file. In accordance with the invention, a utility service provider server accepts a notice to dig and thereafter parses and detects data corresponding to the proposed dig site. Thereafter the server compiles map files, associated display and processing algorithms as well as other relevant background information and generates a Ticket to be transmitted to field personnel. The received Ticket contains an entire instruction set necessary for the creation of a locally generated, new, enhanced and/or enlarged second level map display. The enhanced and/or enlarged area is subdivided by grid blocks by the intersection of longitudinal and latitudinal lines placed over the first level map display. Each of the grid blocks contains a unique identifier as well as a series of one or more indexed or associated algorithms necessary for the display of an enhanced and/or enlarged second level map display. The resident mapping software in a field laptop processes the received instruction set to create a new second level map display. In this manner, field personnel obviate the need for a reconnection and a subsequent request for a download of a second level map having an enhanced and/or enlarged display of a selected area.

BRIEF DESCRIPTION OF THE DRAWINGS

These and other features of the present invention will best be understood by reference to the following brief description of a preferred embodiment of the invention, taken in conjunction with accompanying drawings, in which:

FIG. 2 illustrates an exemplar Notification to Dig sent by a One Call Center in response to a facilities marking request;

FIG. 3 illustrates an exemplar Ticket used by a Utilities Services provider and generated in response to receipt of a Notification to Dig;

DETAILED DESCRIPTION

The present invention generally relates to a method and system for providing network-based facility maps and related information to field personnel. Although the present invention is described in the context of ticket distribution to field personnel, it has broader applications. In particular, the invention may be useful in other communications wherein mapping data is necessary to carry out map-based inspection, such as construction site planning and construction approval.

Figure 1:
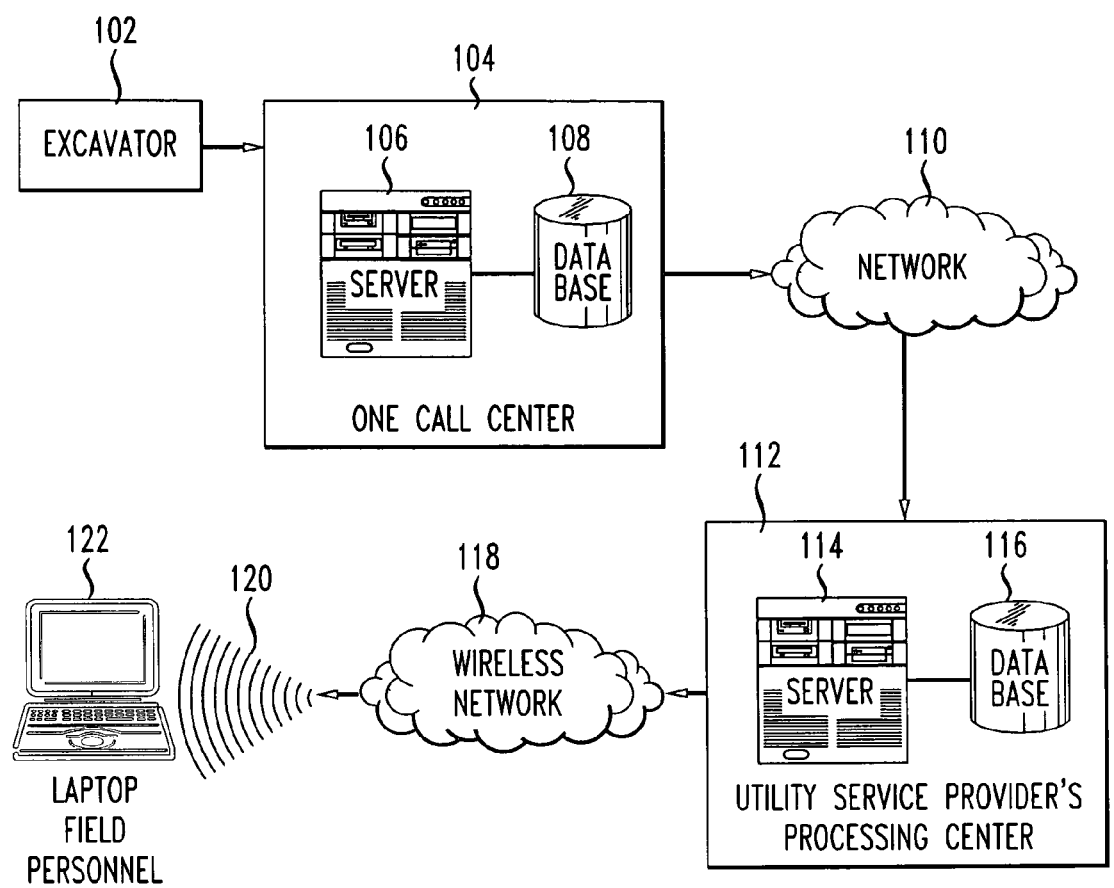
FIG. 1 illustrates a functional block diagram of a One Call system in communication with a utility provider's ticket processing center.

FIG. 1 illustrates a functional block diagram of a One Call system in communication with a utility service provider's ticket processing center. In the event of a need for the excavation of a site, excavator 102 places a call to a regional One Call Center ("OCC") 104 via an "8xx" toll free number to report their intention to dig. The One Call Center operator takes all relevant information about the excavator and about the proposed dig site and enters the data into their OCC server 106. Data taken from the excavator is processed by resident software on OCC server 106 to generate a notification to dig notice ("ND notice"). The ND notice is a summary of the data taken by the OCC operator and is stored in an OCC database 108. In processing the ND notice, the resident software on the OCC server 106 correlates the dig site with the known utility service providers ("USP") within the area of the site that may be affected by the proposed excavation. As mandated by federal and state law, the OCC notifies the affected or potentially affected USP of the proposed dig site. As shown in FIG. 1, the OCC 104 communicates with a USP Processing Center 112 through a communications network 110. The communications network 110 may take the form of a myriad of transmission media, such as the Internet, PSTN, wireless network, LAN or dedicated high speed access lines. Regardless of the form of communication, the OCC 104 and the USP Processing Center 112 are in communication to allow the free flow of ND notices. The ND notices are generally ASCII files containing excavator and dig site information. The format and protocol used in relaying the ND notices are generally standardized and follow a basic data structure and protocol. However, other data may be included to facilitate the processing of the ND notice. Descriptive data about the proposed site, such as a local government's (i.e., town, township, borough, etc.) map plat designations such as block and lot number, or the longitudinal and latitudinal coordinates of the targeted area as well as assigned geocodes may also be provided to better designate the proposed dig site.

Upon receipt of the ND notice at the USP Processing Center 112, the ND notice is processed by the USP server 114. The data conveyed by the ND notice is extracted and formatted into the USP's specific format. In particular, the ND notice data is included in a "Ticket" generated by the USP server 114 that will be forwarded to USP field personnel. The resident software in the USP server 114 parses and detects certain ND notice data necessary for the generation and distribution of the Ticket. More specifically, the USP server 114 detects longitudinal and latitudinal coordinates, geocodes or other site-designating coordinates or indicia of location to isolate within its own mapping data the exact location of the proposed dig site. If site-locating data is not provided by the OCC, the USP uses USP processing personnel to manually assign site locating data that is descriptive of the proposed dig site.

Once having detected or manually ascertained site-locating data, the resident software in USP server 114 uses the site-locating data to correlate or assign other data, such as one or more digital map files, facility overlays, USP facility descriptors and their relative locations, and algorithms to be used in the interpretation and processing of the digital map files and the overall Ticket as a whole. Based on the location of the proposed dig site, the USP server 114 correlates the dig site to a pre-assigned USP field inspector having responsibility for the proposed dig site. When the USP server 114 has compiled all necessary data to generate the Ticket, the Ticket is issued, stored in USP database 116 and wirelessly transmitted to the assigned USP field personnel. As shown in FIG. 1, the USP Processing Center 112 is in communication with a wireless network 118 responsible for the wireless transmission of the Ticket. The wireless network 118 is preferably a commercial wireless network operated by a regional wireless carrier having broad coverage of the region served by the USP. Alternatively, however, the wireless network 118 may be a dedicated and regionalized wireless transmission system operated for the sole purpose of providing communications services to field personnel. The Ticket is transmitted from the USP processing center 112 to the wireless network 118 via a wireless communications link or via a landline switched or dedicated communications link. The wireless network 118 broadcasts the Ticket via wireless signal 120 and is received by a USP laptop 122 having a wireless interface card for reception. The data received by the laptop 122 may be transmitted in encrypted and compressed format in order to maximize security and to minimize connection time.

FIG. 2 illustrates an exemplar Notification to Dig Notice sent by a One Call Center in response to a facilities marking request. The ND notice as discussed above is primarily an ASCII file containing the basic background information about the proposed dig site. However, what is of particular importance is the site location data provided therein. The site information may be described by various ways including geocodes, tax map block and lot numbers, as well as longitudinal and latitudinal coordinates which form boundary points of the proposed dig site location. In more advanced OCC systems, however, the OCC server 106 may employ the use of a proprietary area-locating system which utilizes geocodes such as for example "NJBED4866" (as shown in FIG. 2), to define the dig site location. Regardless of the methods employed to designate the proposed dig site, the USP server 114 of the present invention is configured to parse and detect such standard and proprietary site-locating data. USP server 114 is equipped with a look up database 116 which in accordance with an algorithm employed by the resident software correlates the received dig site identifiers such as lat./lon., block/lot, geocodes and the like with site identifiers used in the USP Ticket generating system.

Figure 4:
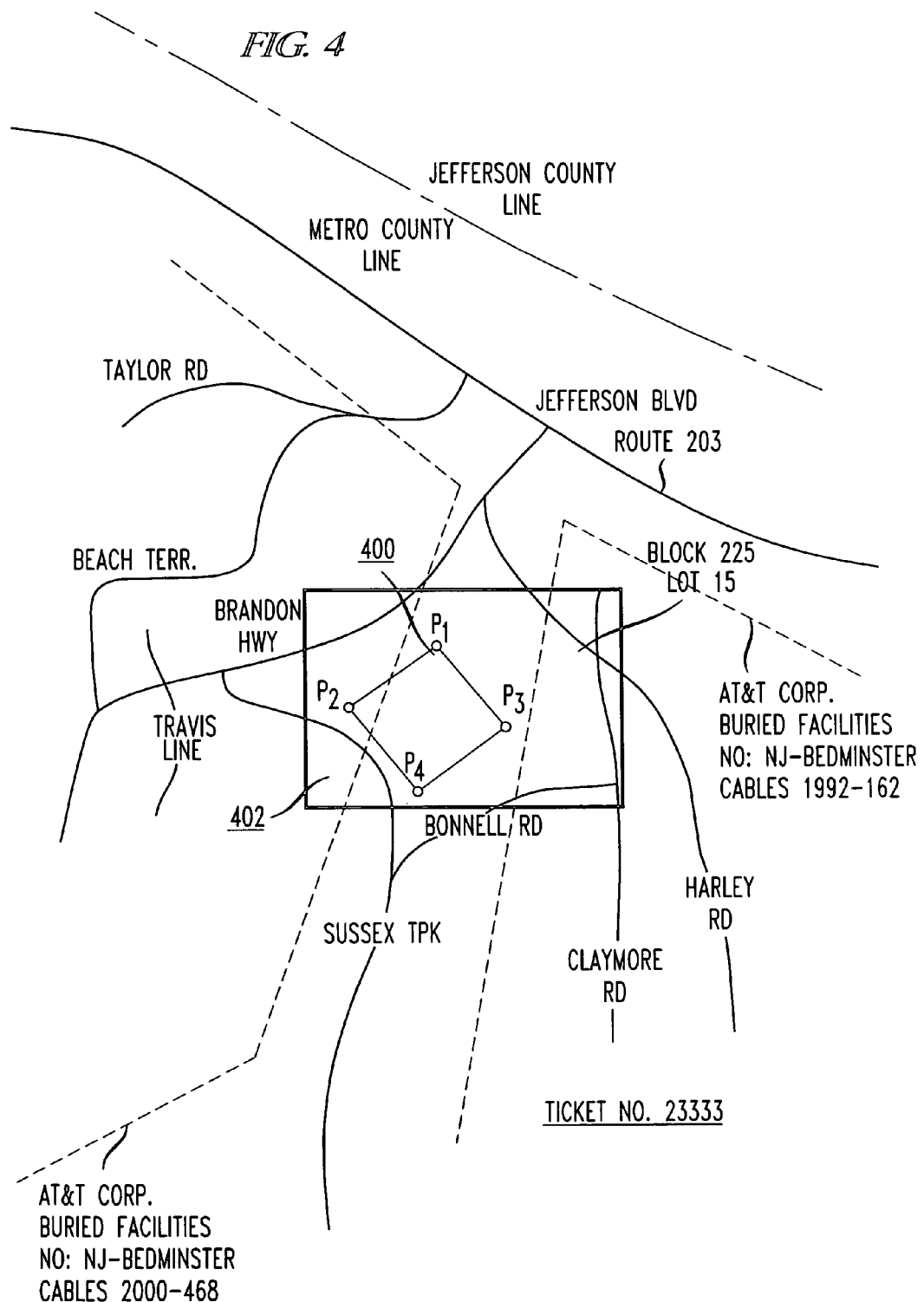
FIG. 4 illustrates a digital first level map accompanying the exemplar Ticket in FIG. 3 and designating a sub-section of the first level digital map for enhancement and/or enlargement.

Shown in FIG. 3. is an exemplar Ticket used by a Utilities Services provider and generated in response to receipt of the Notification to Dig notice shown in FIG. 2. On its face, the Ticket shown in FIG. 3 contains the same background information submitted in the ND notice sent by the OCC 104. However, and as shown toward the bottom portion of FIG. 3, the Ticket contains internal processing data, mapping data and display algorithms sent and linked with the specific Ticket sent to field personnel and generated as a result of receiving the ND notice. As part of the Ticket generation and transmission process, USP server 114 appended a map plat having a geocode=121BNJ. The map plat attached to the Ticket is a map file which contains a mapping of the area of interest. The map file may take the form of various known methodologies of map storage, including but not limited to bitmapped, Gif, Mpeg, Mpegll, Vectored or Tiff map files and may be compressed and encrypted for added security. For purposes of illustration and not by way of limitation, the attached map file is preferably a bitmapped (or vectored) black and white map file containing the dig site. As an attachment to the Ticket, the map file is accessible through an executable link, shown in FIG. 3 as "Map Level 1". By clicking on the "Map Level 1" link, the resident software on laptop 122 will in accordance with its own operating protocol open the map file and display the dig site 400 as shown in FIG. 4. As shown, the displayed map file indicates the presence of at least two known telecommunications cables (NJ-Bedminster, 2000-468 & 1992-162) that may be at risk if the proposed excavation was conducted without an inspection and marking of the dig site 400.

In accordance with the present invention, a field inspector in receipt of the map file may, in advance of inspection and marking, seek to further identify possible risks associated with the excavation by initiating a second map level viewing of the proposed dig site 400. As shown in FIG. 4, a field inspector viewing the first level displayed bitmapped file may zoom-in on the area of interest to obtain greater detail of the facilities that may be at risk of damage. Selection of the area within the displayed map that requires detail enhancement and/or enlargement may be accomplished in a number of known ways. In particular, the inspector may simply go back to the Ticket and click through an executable link labeled "Map Level 2" which in accordance with a pre-programmed algorithm will display an enhanced version of the map displayed during the initial display of the map under Map Level 1. Alternatively, the inspector may designate the exact area of enlargement and enhancement by opening a frame 402 around the area of interest and executing an enhancement option resident on the application software used in laptop 122 to receive and display Ticket information.

Enhancement of the selected and framed region is accomplished by following a set of instructions or algorithms which is either sent during the receipt of the Ticket or is already resident on the laptop 122. In either case, the Mapping Enhancement Program ("MEP") resident on laptop 122 uses these activated algorithms to create a new mapping display which enlarges and/or enhances the level of detail at the laptop 122. Unlike other downloadable mapping systems, no other additional map files are required or fetched from the USP server 114. Because of the full set of instructions received by the laptop 122 and the resident MEP software used to interpret and display the received set of instructions, a new enhanced and/or enlarged version (second level) of the map display can be locally created. A creation of an enlarged and/or enhanced display of the dig site will not only expedite the inspection process by not having to reconnect with the USP server 114 for the transmission of a new more localized enlarged and/or enhanced version of the bitmap file, but the new and localized version (second level) of the map display may be stored in memory for later use and modification.

A command to enhance and/or enlarge the map display has the effect of calling into play several map display algorithms. As shown in FIG. 3, the Ticket was downloaded to the field laptop 122 with a bitmapped map file designated as operational in conjunction with algorithms 23, 101 and 44 (shown in the bottom right hand corner of FIG. 3). It should be understood, however, that the designated algorithm may become operational either alone or in combination with other algorithms or software modules (including MEP) resident on the laptop 122 or transmitted to the laptop 122 at the time that the Ticket was downloaded. For example, algorithm 23 may have been sent during the Ticket download or may have been resident on the laptop 122 and activated during the execution of the enlargement command. Moreover, the algorithm 23 may require the cooperation and interaction with the original bitmapped file and/or the interaction with other algorithms downloaded to the laptop 122 or resident therein. How each algorithm and bitmapped file will interact with each other is predetermined by the instructions sent during the download of the Ticket or software modules in the MEP or other resident software.

During a request to enlarge and/or enhance, the MEP software detects the algorithms to be used in the enlargement and/or enhancement process. With respect to the Ticket and map display shown in FIGS. 3 & 4, algorithm 23 is selected as the methodology for the next level of enlargement and/or enhancement. Algorithm 23 designates a bit-by-bit fill-in manipulation to reconstruct the display without the need for a new bitmap file download of the enlarged and/or enhanced display. Under algorithm 23, a portion or the entire selected or framed portion of the original bitmap display will be processed to locally create a new bitmap file bounded by the frame area and selected by the inspector. For example, if the framed or selected portion of the area to be displayed was represented by a 5×5 bitmap, algorithm 23 would, in designated areas, insert a pixel on the screen in between each of the existing pixels so as to create a new 10×10 bitmap matrix—the result being a 100% enlargement of the framed or selected display. For example, a 5×5 bitmap matrix represented by a pixel matrix of 1, 3, 5, 7, 9×1, 3, 5, 7, 9 would result in a new 10×10 pixel matrix of 1, 2, 3, 4, 5, 6, 7, 8, 9, 0×1, 2, 3, 4, 5, 6, 7, 8, 9, 0 wherein the added horizontal and vertical pixels are represented by pixels 2, 4, 6, 8, 0. Of course the algorithm would, in addition to merely inserting additional pixels to augment the size of the display, take into consideration the orientation of the pixels and maintain the same relation or aspect ratio with respect to the rest of the pixels. More specifically, the road boundaries shown in FIG. 5 that are designated to be in accordance with algorithm 23 are broadened and lengthened while maintaining the same orientation and relationship with the rest of the map display. This basic and illustrative enhancement and/or enlargement algorithm, however, is not limiting of the invention since other more advanced and well known methods of display enhancement and/or enlargement, such as vector-oriented display and enlargement, may be made in accordance with the invention.

Figure 5:
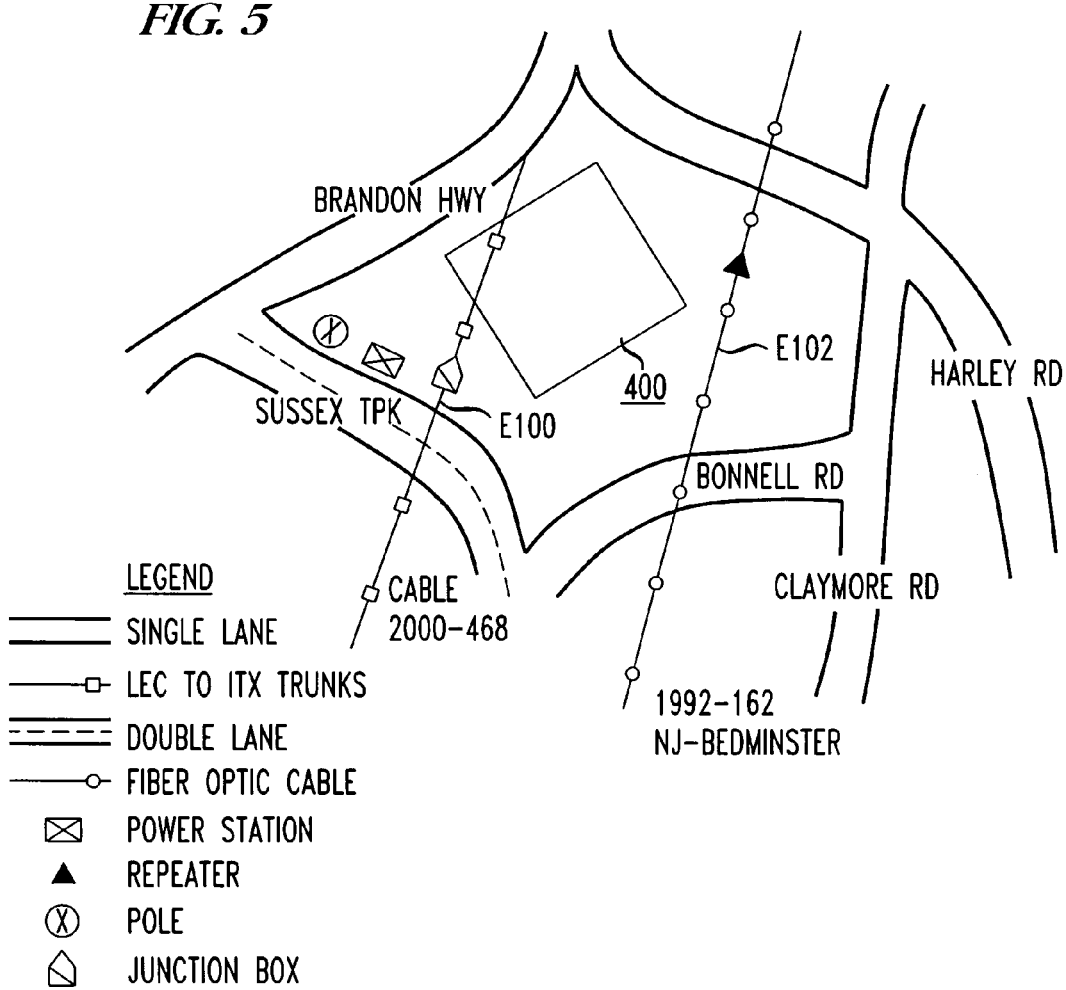
FIG. 5 illustrates the sub-section designated by field personnel for enhancement and/or enlargement in accordance with the present invention.

In addition to algorithm 23, algorithms 101 and 44 as shown in the bottom right hand section of FIG. 3. have been designated as applicable to the enlargement and/or enhancement of the any framed area in the original bitmap display of the dig site 400. In particular, algorithms 101 and 44 designate the use of an overlay scheme to apply facility-based designations on the enlarged and/or enhanced framed map display. Algorithm 101 is a set of instructions which may be sent with the Ticket or already resident on laptop 122 and which may be activated by an executable command to enlarge the framed area. Algorithm 101 contains information which allocates and positions (overlays) specific facility-based designations, such as pole, power station and the like, in a correct and scaled relationship to the road boundaries and other map-based orientations. As shown in FIG. 5, a pole and power station are placed along "Sussex Tpk" on the north side of the road and near the intersection with "Brandon Hwy". The algorithm 101 will, in accordance with the instruction set received during the download of the Ticket, receive exact data such as "pole, north×Sussextpk/BrandonHwy, scaled 125pix" to designate the location of the pole. It should be understood that the received data for the location of the pole, for example, may take the form of 1) solely the positioning data of the pole (location data), 2) position data and instructions on how to interpret the position data (location data and algorithm), or 3) a trigger or command to call upon an algorithm and positioning data already available on the laptop 122. In either event, the display (second level) created by the framing of the original bitmap is reconstructed by the laptop based on the instruction set transmitted along with the Ticket.

Algorithm 44, like the prior referenced instruction set, designates the coordinate location of the telecommunications cables of interest or cables that were detected as facilities that are at risk and possibly subject to damage. Like algorithm 101, the instruction set for the overlay may vary according to the methods used in a particular system to recreate, enhance and/or enlarge a framed bitmap display. The orientation of cables NJ-Bedminster cables 1992-162 and 2000-468 and associated facilities such as junction boxes, repeaters and splice locations are all positioned in accordance with the instruction set submitted with the downloaded Ticket or by a trigger associated with one or more algorithms.

Figure 6:
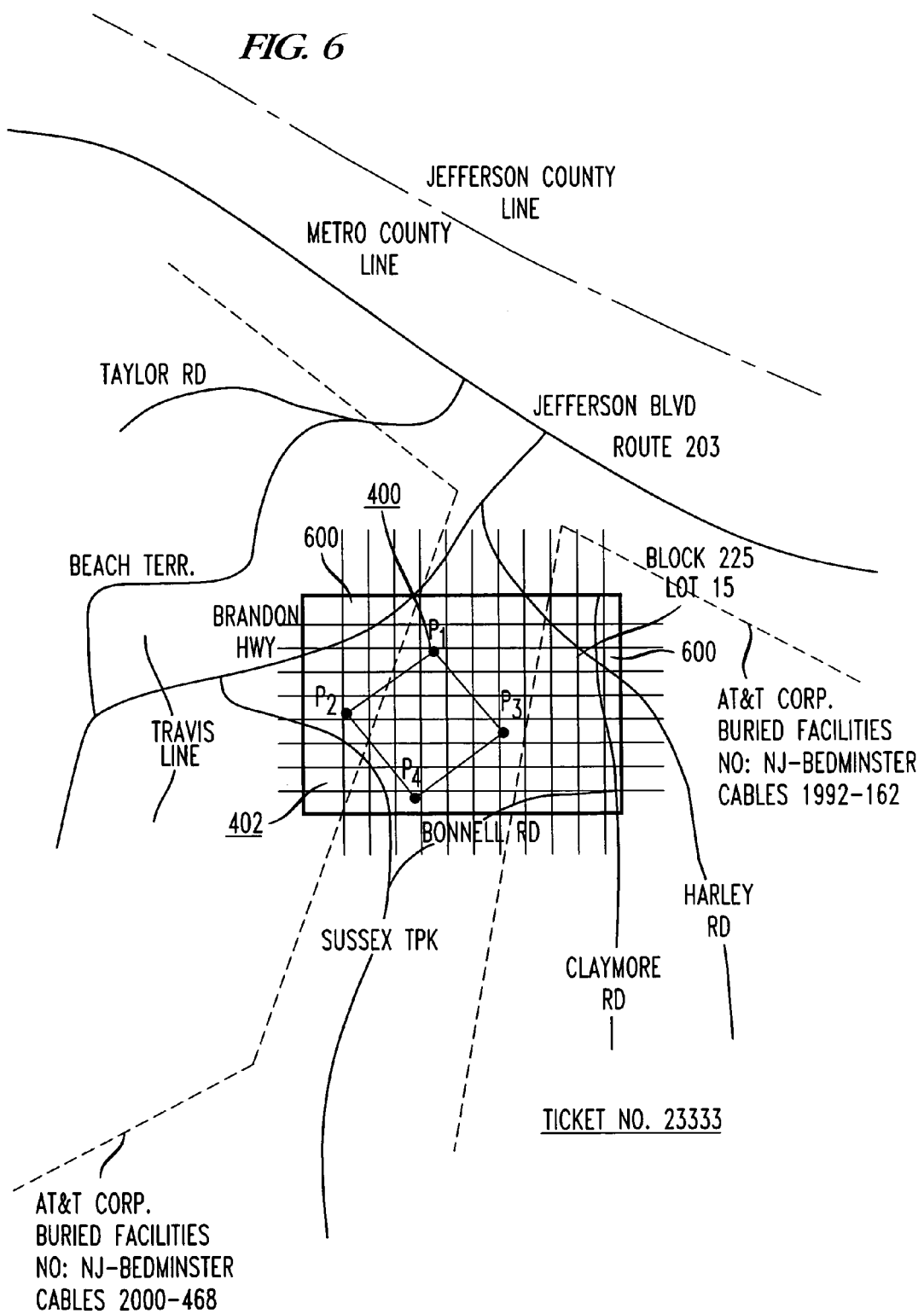
FIG. 6 illustrates the digital map as shown in FIG. 4 with an overlay of grid blocks having associated algorithms.

Each of the designated algorithms, however, is not always applicable to the entire framed or selected sections of the originally received map display, but rather may be designated to particular sections of the framed display. As shown in FIG. 6, the originally received map display is cross-sectioned into sub-sections 600 (also known as "grid blocks") defined by a grid overlay. These sub-sections 600 are each assigned one or more algorithms for the enhancement and/or enlargement of the display. In accordance with the level of enlargement and detail needed, the sub-sections 600 are assigned algorithms such as 23, 101 and 44, alone or in combination or with any other algorithm necessary, for the display of the enhanced and/or enlarged sub-section. As shown in FIG. 6, the framed area selected by the inspector is sub-divided by a coordinate system which utilizes a uniform grid overlay. The grid overlay is preferably transparent during display, but is always available for use upon the execution of an enhancement or enlargement command. The sub-section/algorithm association is accomplished by the use of a grid system based on longitude and latitude graticule lines that define an area by the intersection of east/west longitude lines with north/south latitude lines to generate a grid mapping of the framed section of the map (second level) to be displayed. The degree of resolution is dependent on the particular mapping system used. However, for purposes of illustration and not by way of limitation of the invention, the present invention preferably utilizes a resolution of 15 seconds of longitude by 15 seconds of latitude. The resulting grid block size is 15 sec×15 sec and is referenced by an identifying point on the grid block such as the southeast corner of the grid block and is given a 14-digit unique identifier. For example, the grid block referencing a unique identifier –0753015403030 denotes –075 degrees, 30 minutes, 15 seconds of longitude and 40 degrees, 30 minutes and 30 seconds of latitude. In this manner, a particular grid block is associated with the applicable algorithms to be used in the further enhancement and enlargement of the designated grid block. In accordance with the invention, the designated grid block –0753015403030 is preferably correlated or indexed to be operative with associated algorithms in the following format structure "–0753015403030, 23, 101, 44" (grid block data), and for all other grid blocks of the originally (first level) displayed map. By selecting the boundaries of the section of the originally displayed map to be enlarged and/or enhanced, the grid blocks falling within the bounds of the frame are selected, and each designated and applicable algorithm is activated to locally create a new enlarged and enhanced map of the dig site. The execution of each of these algorithms associated with each grid block is governed by the resident MEP software and other resident software and by the particular instruction set received during the downloading of the Ticket to the field laptop 122. Once the new locally created map display is created and displayed on the laptop 122, the newly created map display (second level) may be stored on the laptop's hard-drive, CD, DVD or any other storage medium or non-volatile memory available to the laptop 122.

Upon inspection of the dig site 400, the inspector may further utilize the Ticket, associated map files and algorithms to respond to the OCC 104 within the allotted time and to correct any discrepancies found in the map data provided. For example, in the event that the inspector determines that, in addition to the existence of the two telecommunications cables, there exists a third and undocumented cable running within the bounds of the map display provided with the Ticket, the inspector may make on-line corrections as required. Any proposed changes are stored as a separate update map file and transmitted back to the USP server 114 for verification and approval. Any approved changes made to the central mapping data at the USP server 114 is finalized and subsequently used during a downstream broadcast of the same map Plat 121BNJ when a subsequent request is made. Preferably, the update to the map Plat 121BNJ is made on a real-time or nearly real-time basis so that subsequent Ticket downloads may have the benefit of an update map file.

Moreover, and after the inspector has concluded the site inspection, and in accordance with the present invention, the field inspector may either through the USP server 114 or through more direct means, such as a wireless link to the OCC 104, immediately respond to the OCC ND notice and confirm the marking of USP facilities. Should subsequent actions be necessary or remarks need to be relayed back to the excavator, the inspector may also as part of the Ticket management system send back via email address or other messaging systems notification to the OCC and excavator of any hazards, ownership of facilities, right of way issues or any other related correspondence necessary to protect the interests of the USP and to comply with state and federal regulations.

The foregoing description of an embodiment of the present invention should be considered as illustrative and not as limiting. The disclosed variations in the map processing system and methods of displaying the enhanced and enlarged versions of the map display are indicative of the many possible embodiments of the present invention. Various other changes and modifications will occur to those skilled in the art for accomplishing the same result and for operating in substantially the same way without departing from the true scope of the invention as defined in the claims appended hereto.

What is claimed is:

1. A method of processing and displaying enhancements to a digital map on a display screen of a display device, comprising:
   receiving a ticket comprising a first level digital map file of buried facilities and a set of associated display instructions comprising one or more algorithms;
   displaying the first level digital map file as a first level digital map display on the display device;
   selecting a portion of the first level digital map display for enhancing or enlarging the selected portion of the first level digital map display, wherein an enhancement or an enlargement of said selected portion is stored within said ticket;
   detecting within the received ticket, one or more assigned algorithms required for the display of the selected portion of the first level digital map display;
   creating, via the display device, a second level digital map file of buried facilities and a second level digital map display detailing the selected portion of the first level digital map display in accordance with the display instructions of the detected one or more assigned algorithms required for display of the second level digital map display;
   displaying the second level digital map display on the display device;
   receiving a dig notification;
   detecting locating information within the received dig notification for identifying a location of a dig site; and
   correlating the dig site with the first level digital map file and the display instructions.

2. The method of claim 1, further comprising assigning one or more algorithms to the first level map file for enhancing any selected portion of the first level map display.

3. The method of claim 1, further comprising overlaying a grid over the first level map display so as to subdivide the first level map display into unique and selectable grid blocks.

4. The method of claim 3, further comprising assigning one or more display algorithms to each of the grid blocks.

5. The method of claim 4, further comprising displaying each of said grid blocks in accordance with a set of display instructions within each of the one or more algorithms assigned to each of the grid blocks.

6. The method of claim 1, further comprising transmitting the ticket over a wireless medium to a receiving wireless displaying device.

7. A method of processing and displaying enhancements and enlargements to a digital map on a display screen of a wireless and remote display device, comprising:
   receiving a ticket comprising a first level digital map file of buried facilities and a set of associated display instructions comprising one or more algorithm identifiers for designating algorithms resident on the display device to be used in the enhancement and enlargement of a display on the display device;
   displaying the first level digital map file as a first level digital map display on the display device;
   selecting a portion of the first level digital map display for enhancing or enlarging the selected portion of the first level digital map display, wherein an enhancement or an enlargement of said selected portion is stored within said ticket;
   detecting, within the received ticket, one or more algorithm identifiers required for the display of the selected portion of the first level digital map display;
   creating, via the display device, a second level digital map file of buried facilities and a second level digital map display detailing the selected portion of the first level digital map display in accordance with the display instructions of one or more assigned algorithms corresponding to the one or more detected algorithm identifiers required for display of the second level digital map display;
   displaying the second level digital map display on the display device;
   receiving a dig notification;
   detecting locating information within the received dig notification for identifying a location of a dig site; and
   correlating the dig site with the first level digital map file and the display instructions.

8. The method of claim 7, further comprising assigning one or more algorithm identifiers to the first level map file for the enhancement of any selected portion of the first level map display.

9. The method of claim 7, further comprising overlaying a grid over the first level map display so as to subdivide the first level map display into unique and selectable grid blocks.

10. The method of claim 9, further comprising assigning one or more display algorithm identifiers to each of the grid blocks.

11. The method of claim 10, further comprising displaying each of said grid blocks in accordance with a set of display instructions within each of the one or more algorithms assigned to each of the grid blocks.

12. The method of claim 7, further comprising transmitting the ticket over a wireless medium to a receiving wireless displaying device.

13. A system for processing and displaying enhancements and enlargements to a digital map on a display screen of a wireless and remote display device, comprising:
   a server for receiving a dig notification and for detecting locating information for identifying a dig site within the received dig notification and for subdividing a first map of buried facilities into sub-sections and assigning each sub-section with a display algorithm, wherein said dig site is correlated with the first map; and
   a wireless display device in wireless communication with the server for displaying the first map of buried facilities and creating and displaying a second map of buried facilities in accordance with a designated display algorithm assigned to the sub-sections of the first map, wherein said second map comprises an enhancement or an enlargement of one or more of said sub-sections of said first map.

14. The system of claim 13 further comprising a means for wirelessly transmitting a ticket containing locating information and a set of instructions for creating and displaying at the wireless device the second map in accordance with the designated display algorithm assigned to the sub-sections of the first map.

15. The system of claim 13 wherein the server is operative for overlaying a grid over the first level map display so as to sub-divide the first level map display into unique and selectable sub-sections.

16. The system of claim 13 wherein the wireless display device is operative for displaying each of the sub-sections in accordance with a set of display instructions associated with each of the sub-sections.

17. A system for processing and displaying enhancements and enlargements to a digital map on a display screen of a wireless and remote display device, comprising:

a server for receiving a dig notification and for detecting locating information with the received dig notification and for identifying the location of a dig site;

a wireless display device in communication with the server for receiving a ticket comprising a first level digital map file of buried facilities and a set of associated display instructions comprising one or more algorithm identifiers for designating the algorithms resident on the display device to be used in the enhancement and enlargement of a display on the display device, displaying the first level digital map file as a first level digital map display on the display device, selecting a portion of the first level digital map display for enhancing or enlarging the selected portion of the first level digital map display, wherein an enhancement or an enlargement of said selected portion is stored within said ticket, detecting within the received ticket, one or more algorithm identifiers required for the display of the selected portion of the first level digital map display, creating a second level digital map file of buried facilities and a second level digital map display detailing the selected portion of the first level digital map display in accordance with the display instructions of one or more assigned algorithms corresponding to the one or more detected algorithm identifiers required for display of the second level digital map display, wherein said dig site is correlated with the first level digital map.

\* \* \* \* \*